US 9,446,767 B2

(12) United States Patent
Hirai et al.

(10) Patent No.: US 9,446,767 B2
(45) Date of Patent: Sep. 20, 2016

(54) TRAVEL CONTROLLER FOR VEHICLES

(71) Applicants: Takuya Hirai, Susono (JP); Rentaro Kuroki, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Takuya Hirai, Susono (JP); Rentaro Kuroki, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/439,305

(22) PCT Filed: Oct. 31, 2012

(86) PCT No.: PCT/JP2012/078225
§ 371 (c)(1),
(2) Date: Apr. 29, 2015

(87) PCT Pub. No.: WO2014/068717
PCT Pub. Date: May 8, 2014

(65) Prior Publication Data
US 2015/0274166 A1 Oct. 1, 2015

(51) Int. Cl.
*F02D 13/08* (2006.01)
*F02D 41/00* (2006.01)
(Continued)

(52) U.S. Cl.
CPC .............. *B60W 30/18* (2013.01); *B60W 10/02* (2013.01); *B60W 10/06* (2013.01); *F02D 13/06* (2013.01);
(Continued)

(58) Field of Classification Search
CPC .... F02D 13/06; F02D 13/08; F02D 41/0087; F02D 41/2441; B60W 2710/02; B60W 2710/06
See application file for complete search history.

(56) References Cited

U.S. PATENT DOCUMENTS

| 6,412,455 | B1* | 7/2002 | Ogiso | B60T 13/52 |
| | | | | 123/399 |
| 2003/0054911 | A1* | 3/2003 | Sato | F16H 61/067 |
| | | | | 475/129 |

FOREIGN PATENT DOCUMENTS

JP          2002-227885 A        8/2002

OTHER PUBLICATIONS

International Search Report issued Nov. 27, 2012 in PCT/JP2012/078225 filed Oct. 31, 2012.

*Primary Examiner* — Tisha Lewis
(74) *Attorney, Agent, or Firm* — Oblon, McClelland, Maier & Neustadt, L.L.P

(57) ABSTRACT

A running control device of a vehicle includes an engine with a plurality of cylinders, and a clutch connecting/disconnecting a power transmission path between the engine and wheels, the running control device of a vehicle performing during an inertia running mode a neutral inertia running mode performed with the power transmission path between the engine and the wheels disconnected while the engine is kept operated, and a cylinder resting inertia running mode performed by resting at least a part of the cylinders of the engine while the power transmission path between the engine and the wheels is connected, the running control device of a vehicle increasing an operation region of performing the neutral inertia running mode in an operation region of performing the inertia running mode when idle learning performed in an idle operation state of the engine is incomplete, as compared to after completion of the idle learning.

4 Claims, 7 Drawing Sheets

(51) Int. Cl.
    *F02D 41/24* (2006.01)
    *B60W 30/18* (2012.01)
    *F02D 13/06* (2006.01)
    *F02D 29/02* (2006.01)
    *F02D 41/12* (2006.01)
    *F02D 31/00* (2006.01)
    *B60W 10/02* (2006.01)
    *B60W 10/06* (2006.01)
    *F02D 41/02* (2006.01)

(52) U.S. Cl.
    CPC ............. *F02D 29/02* (2013.01); *F02D 31/003* (2013.01); *F02D 41/123* (2013.01); *F02D 41/2441* (2013.01); *B60W 2710/02* (2013.01); *B60W 2710/06* (2013.01); *F02D 41/0087* (2013.01); *F02D 41/022* (2013.01); *F02D 41/0295* (2013.01); *Y02T 10/18* (2013.01)

| RUNNING MODE | ENGINE 12 | CLUCH C1 | DECELERATING FORCE |
|---|---|---|---|
| ENGINE BRAKE RUNNING | F/C; DRIVEN ROTATION | ENGAGED | LARGE |
| CYLINDER RESTING INERTIA RUNNING | F/C; DRIVEN ROTATION | ENGAGED | MEDIUM |
| NEUTRAL INERTIA RUNNING | IDLE ROTATION | RELEASED | SMALL |
| FREE-RUN INERTIA RUNNING | F/C; ROTATION STOP | RELEASED | SMALL |

TRAVEL CONTROLLER FOR VEHICLES

TECHNICAL FIELD

The present invention relates to a running control device of a vehicle and particularly to the control during an inertia running mode.

BACKGROUND ART

With regard to a well-known engine brake running mode (fuel cut inertia running mode) performed with engine brake applied by driven rotation of an engine while a power transmission path between the engine and wheels is kept connected, an inertia running mode performed with an engine brake force made lower than that of the engine brake running mode is conceived for extending a running distance and contributing to improvement in fuel consumption. A device described in Patent Document 1 is an example thereof and a control device is described that performs, for example, a neutral inertia running mode performed with a power transmission path disconnected between an engine and wheels while the engine is put in idle operation, or a free-run inertia running mode performed with the power transmission path disconnected between the engine and the wheels while the engine is stopped, thereby eliminating the engine brake so as to extend a running distance and contribute to improvement in fuel consumption. Although not depicted in Patent Document 1, another known method of reducing an engine brake force to extend a running distance and contribute to improvement in fuel consumption is a cylinder resting inertia running mode performed by resting at least a part of cylinders of the engine while the power transmission path is kept connected between the engine and the wheels. Resting a part of the cylinders in this way reduces a pumping loss generated during driven rotation of pistons, resulting in a reduced engine brake force.

PRIOR ART DOCUMENT

Patent Document

Patent Document 1: Japanese Laid-Open Patent Publication No. 2002-227885

SUMMARY OF THE INVENTION

Problem to be Solved by the Invention

It is known that learning of an engine is performed as needed depending on various running states. For example, this includes idle learning performed during idle operation of the engine and deceleration learning performed during deceleration running. Although the learning of the engine is performed as needed even during an inertia running mode, the learning of the engine performable during the inertia running mode is limited. For example, the idle learning for learning an opening degree of an electronic throttle during idle operation cannot be performed during the cylinder resting inertia running mode and during the free-run inertia running mode while the electronic throttle is closed. On the other hand, the deceleration learning for learning a rate of an air flow to a catalyst in an engine driven state cannot be performed during the neutral inertia running mode and during the free-run inertia running mode while the engine is operated in a self-sustaining manner.

If these types of learning cannot be performed and, for example, a vehicle is running without completing the idle learning due to the absence of an opportunity to perform the idle learning, this may cause deteriorations in fuel consumption and emission and, therefore, it is desirable to complete the idle learning early. On the other hand, if the neutral inertia running mode is performed, the engine is put into the idle operation and the idle learning can be performed. Thus, the idle learning can be performed if the neutral inertia running mode is performed during the inertia running mode; however, the neutral inertia running mode is associated with fuel supply to the engine and therefore is not preferable in terms of fuel consumption. Running without completing the deceleration learning may also result in the possibility of causing a defect such as deterioration in emission, for example. On the other hand, if the inertia running mode is not performed until all the learning is completed, fuel consumption cannot be reduced by the inertia running mode.

The present invention was conceived in view of the situations and it is therefore an object of the present invention to provide a running control device of a vehicle capable of performing a neutral inertia running mode and a cylinder resting inertia running mode and capable of improving fuel consumption while ensuring learning opportunities by selectively using the inertia running mode depending on a learning completion status.

Means for Solving the Problem

To achieve the object, the first aspect of the invention provides a running control device of a vehicle including (a) an engine, and a clutch connecting/disconnecting a power transmission path between the engine and wheels, the running control device of a vehicle performing during an inertia running mode a neutral inertia running mode performed with the power transmission path between the engine and the wheels disconnected while the engine is kept operated, and a cylinder resting inertia running mode performed by resting at least a part of the cylinders of the engine while the power transmission path between the engine and the wheels is connected, (b) the running control device of a vehicle increasing an operation region of performing the neutral inertia running mode in an operation region of performing the inertia running mode when idle learning performed in an idle operation state of the engine is incomplete, as compared to after completion of the idle learning.

Effects of the Invention

Consequently, when the idle learning is incomplete, the operation region of performing the neutral inertia running mode increases in the operation region of performing the inertia running mode as compared to after completion of the idle learning. Therefore, the engine is put into the idle operation state during the inertia running mode in an expanded region and the opportunity to perform the idle learning can be ensured. Thus, the idle learning can be completed early to prevent the deteriorations in fuel consumption and emission due to the incomplete idle learning. After completion of the idle learning, since the operation region of performing the neutral inertia running mode is increased, the operation region of performing another type of inertia running mode without fuel injection such as the cylinder resting inertia running mode becomes larger, and the fuel consumption can be improved. After completion of the idle learning, since the operation region of performing the neutral inertia running mode is not increased, the operation region of performing the cylinder resting inertia running mode becomes larger, and the opportunity to perform the deceleration learning can be ensured.

Preferably, the second aspect of the invention provides the running control device of a vehicle recited in the first aspect of the invention, wherein when the idle learning is incomplete, an execution condition of the neutral inertia running mode is made easy to be satisfied as compared to after completion of the idle learning. Consequently, when the idle learning is incomplete, the execution condition of the neutral inertia running mode is more likely to be satisfied and the opportunity to perform the idle learning can be ensured.

Preferably, the third aspect of the invention provides the running control device of a vehicle recited in the first aspect of the invention, wherein when the idle learning is incomplete, an execution condition of the cylinder resting inertia running mode is made hard to be satisfied as compared to after completion of the idle learning. Consequently, when the idle learning is incomplete, since the execution condition of the cylinder resting inertia running mode is less likely to be satisfied, the neutral inertia running mode is more likely to be established instead. Thus, when the idle learning is incomplete, the neutral inertia running mode is more likely to be established and the opportunity to perform the idle learning can be ensured.

Preferably, the fourth aspect of the invention provides the running control device of a vehicle recited in the first aspect of the invention, wherein when deceleration learning is incomplete that is performed during fuel injection to the engine stopped and the engine passively rotated by the wheels, an operation region of performing the cylinder resting inertia running mode is increased in the operation region of performing the inertia running mode as compared to after completion of the deceleration learning. Consequently, when the deceleration learning is incomplete, the operation region of performing the cylinder resting inertia running mode increases in the operation region of performing the inertia running mode as compared to after completion of the deceleration learning, and the opportunity can be ensured for performing the deceleration learning performable during the cylinder resting inertia running mode. Therefore, the deceleration learning can be completed early to prevent the deteriorations in fuel consumption and emission due to the incomplete deceleration learning.

Preferably, a free-run inertia running mode is further included that is an inertia running mode performed by stopping the engine while the power transmission path between the engine and the wheels is disconnected and, if the idle learning is completed and the deceleration learning is completed, an operation region of performing the free-run inertia running mode is increased in the operation region of performing the inertia running mode as compared to when at least one of the idle learning and the deceleration learning is incomplete. As a result, when the idle learning and the deceleration learning are completed, since the operation region of performing the free-run inertia running mode increases in the inertia running mode, the running state of performing the free-run inertia running mode increases in the inertia running mode and the fuel consumption can further be improved.

MODE FOR CARRYING OUT THE INVENTION

Preferably, an operation region map is set in advance that prescribes operation regions of respective types of inertia running mode set based on parameters, such as a vehicle speed, an accelerator operation amount, a stroke amount of a brake pedal, an engine oil temperature, an engine water temperature, and an oil temperature in a transmission, in an operation region of performing the inertia running mode. Therefore, by changing a boundary value (threshold value) of each parameter prescribing the operation region, the operation regions of the respective types of inertia running mode can be changed.

Preferably, an execution condition of the inertia running mode can be changed by changing a threshold value of each parameter prescribing the operation region to increase/decrease the operation regions of the respective types of inertia running mode. For example, when an operation region of an arbitrary type of inertia running mode is increased, the execution condition of the type of inertia running mode is more likely to be satisfied and, when an operation region of a type of inertia running mode is decreased, the execution condition of the type of inertia running mode is less likely to be satisfied.

Preferably, the idle learning is the learning to adjust a closing amount of an electronic throttle valve during the idle operation of the engine to an optimum value such that vibrations and rotation speed variations are suppressed during the idle operation, for example.

Preferably, the deceleration learning includes, for example, learning to set an air-fuel ratio of the engine to an optimum state and learning to detect variations in tooth width of outer circumferential teeth formed on a crankshaft for detecting a crank angle of the crankshaft. The learning to maintain the air-fuel ratio in the optimum state requires a flow of air at the time of learning, while the learning to detect variations in tooth width does not require a flow of air and can be performed as long as the crankshaft is rotating.

An example of the present invention will now be described in detail with reference to the drawings. In the following example, the figures are simplified or deformed as needed and portions are not necessarily precisely depicted in terms of dimension ratio, shape, etc.

FIRST EXAMPLE

Figure 1:
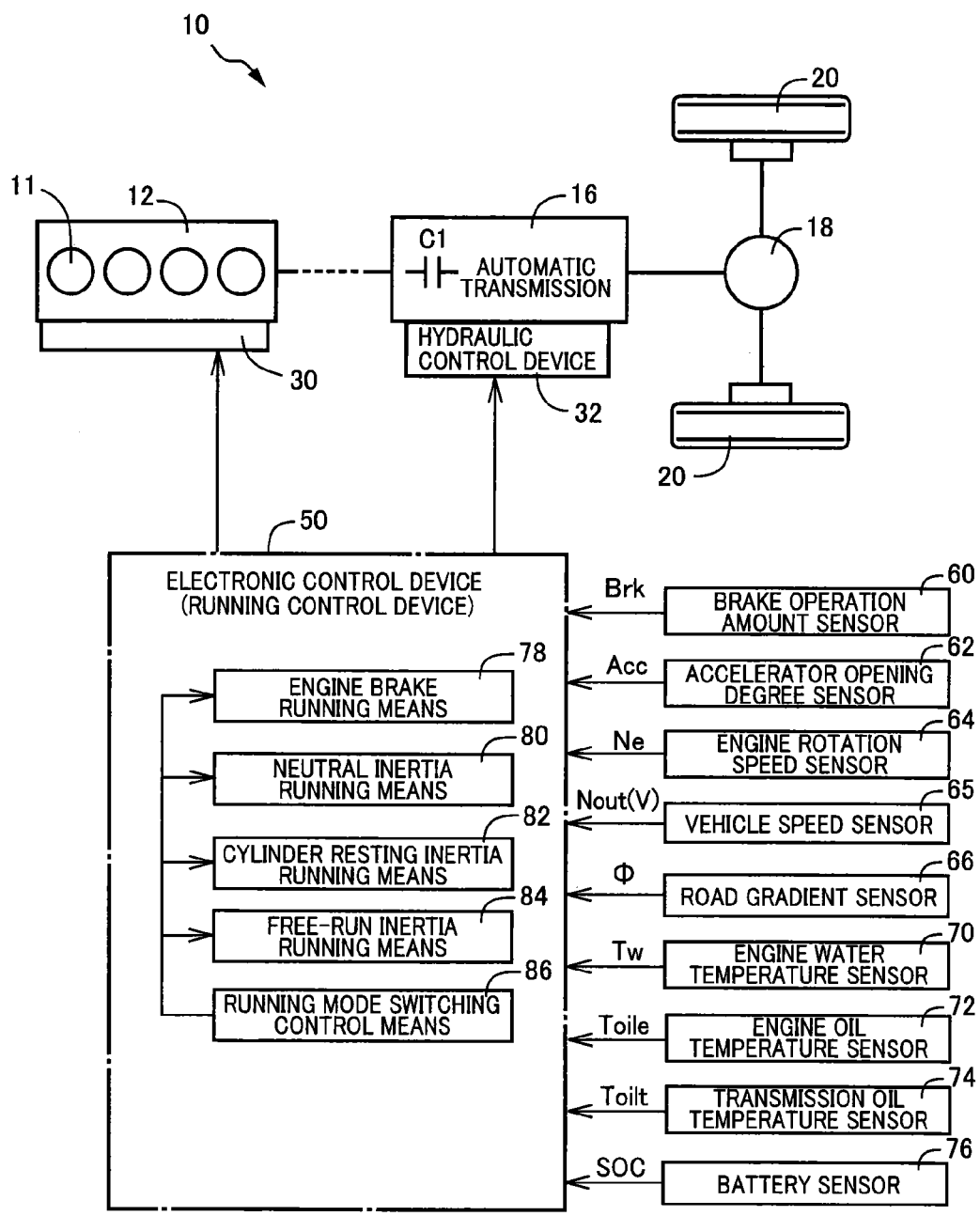
FIG. 1 is a schematic configuration diagram including a schematic of a vehicle drive device to which the present invention is preferably applied along with a main portion of a control system.

FIG. 1 is a schematic configuration diagram including a schematic of a vehicle drive device 10 to which the present invention is preferably applied along with a main portion of a control system. The vehicle drive device 10 includes as a drive force source an engine 12 with a plurality of cylinders 11 that is an internal combustion engine such as a gasoline engine and a diesel engine generating power from combustion of fuel, and the output of the engine 12 is transmitted from an automatic transmission 16 via a differential gear device 18 to left and right wheels 20. A damper device and a power transmission device such as a torque converter are disposed between the engine 12 and the automatic transmission 16, and a motor generator acting as a drive force source can also be disposed therebetween.

The engine 12 includes an engine control device 30 having various pieces of equipment necessary for output control of the engine 12, such as an electronic throttle valve and a fuel injection device. The electronic throttle valve and the fuel injection device control an intake air amount and a fuel supply amount, respectively, and are basically controlled depending on an operation amount of an accelerator pedal (an accelerator opening degree) Acc that is an output request amount of a driver. The fuel injection device can stop the fuel supply (perform a fuel cut F/C) at the time of acceleration-off when the accelerator opening degree Acc is zero even during running of the vehicle. The engine control device 30 also includes a cylinder resting device resting intake/exhaust valves in a part or all of the cylinders 11. The cylinder resting device is a known technique and, therefore, specific structure and operation thereof will not be described.

The automatic transmission 16 is a stepped automatic transmission of a planetary gear type etc., having a plurality of gear stages with different gear ratios y established depending on engaged/released states of a plurality of hydraulic friction engagement devices (clutches and brakes) and is subjected to shift control by electromagnetic hydraulic control valves, switching valves, etc. disposed in a hydraulic control device 32. A clutch C1 acts as an input clutch of the automatic transmission 16 and is also subjected to engagement/release control by the hydraulic control device 32. The clutch C1 corresponds to a connecting/disconnecting device (clutch) connecting and disconnecting a power transmission path between the engine 12 and the wheels 20, i.e., connecting/disconnecting the power transmission path. The automatic transmission 16 may be implemented by using a continuously variable transmission of a belt type etc., instead of a stepped transmission.

The vehicle drive device 10 configured as described above includes an electronic control device (running control device) 50. The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 is supplied with a signal indicative of a brake operation force Brk from a brake operation amount sensor 60, a signal indicative of the accelerator opening degree Acc from an accelerator opening degree sensor 62, a signal indicative of a rotation speed (an engine rotation speed) Ne of the engine 12 from an engine rotation speed sensor 64, a signal indicative of a rotation speed Nout (an output shaft rotation speed Nout) of an output shaft of the automatic transmission 16 corresponding to a vehicle speed V from a vehicle speed sensor 65, a signal indicative of a road gradient Φ of a road surface from a road gradient sensor 66, a signal indicative of an engine water temperature Tw from an engine water temperature sensor 70, a signal indicative of an engine oil temperature Toile from an engine oil temperature sensor 72, a signal indicative of a transmission oil temperature Toilt that is an oil temperature of hydraulic oil in the automatic transmission 16 from a transmission oil temperature sensor 74, a signal indicative of a remaining amount SOC of a battery from a battery sensor 76, etc. Other various pieces of information necessary for various controls are also supplied.

The electronic control device 50 functionally includes an engine brake running means 78, a neutral inertia running means 80, a cylinder resting inertia running means 82, a free-run inertia running means 84, and a running mode switching control means 86. The neutral inertia running means 80, the cylinder resting inertia running means 82, and the free-run inertia running means 84 are for the purpose of performing respective inertia running modes depicted in FIG. 2.

The engine brake running means 78 performs an engine brake running mode (hereinafter also referred as "engine brake running") in an inertia running performable running state (a state in which an inertia running mode can be performed) in which the accelerator opening degree Acc is equal to or less than a predetermined value while the vehicle speed V is equal to or greater than a predetermined value. The engine brake running mode is performed with the clutch C1 engaged to maintain a coupling state between the engine 12 and the wheels 20 and an engine brake is generated by a pumping loss, a friction torque, etc. from the driven rotation of the engine 12. The engine 12 is maintained in a fuel cut (F/C) state with fuel supply stopped. The automatic transmission 16 has a predetermined gear stage established depending on the vehicle speed V etc., and the clutch C1 is retained in an engaged state. As a result, the engine 12 is driven to rotate at a predetermined rotation speed determined depending on the vehicle speed V and the gear ratio y and the engine brake force having a magnitude corresponding to the rotation speed is generated.

The neutral inertia running means 80 performs a neutral inertia running mode (hereinafter also referred as "neutral inertia running") in the inertia running performable running state. In the neutral inertia running mode, as described in the correspondence table of FIG. 2, the inertia running mode is performed by releasing the clutch C1 to separate the engine 12 from the wheels 20 while the engine 12 is supplied with fuel and operated in an idle operation state (an idling state). In this case, since the engine brake force becomes smaller than that of the conventional engine brake running mode and, specifically, the release of the clutch C1 results in the engine brake force of substantially zero, a reduction in running resistance extends the running distance in the inertia running mode, and fuel consumption can be improved. Although fuel is consumed by operating the engine 12 in the idle operation state, since the distance in the inertia running mode becomes longer as compared to the engine brake running mode, a frequency of reacceleration is reduced and overall fuel consumption is improved.

The cylinder resting inertia running means 82 performs a cylinder resting inertia running mode (hereinafter also referred as "cylinder resting inertia running") in the inertia running performable running state. In the cylinder resting inertia running mode, as described in the correspondence table of FIG. 2, the fuel supply to the engine 12 is stopped (a fuel cut F/C is performed) while the engaged state of the clutch C1 is maintained with the power transmission path between the engine 12 and the wheels 20 coupled, and the cylinder resting device of the engine control device 30 stops the intake/exhaust valves in a part (e.g., half) of multiple cylinders 11 all at the positions where the valves are in the closed valve state. In this case, since the intake/exhaust valves of a part of the cylinders 11 are stopped in the closed valve state although the crankshaft is driven to rotate depending on the vehicle speed V and the gear stage of the automatic transmission 16, a loss due to a pumping action (pumping loss) becomes smaller as compared to the case of opening/closing in synchronization with the crankshaft, and the engine brake force is reduced as compared to the engine brake running mode. As a result, the inertia running distance in the inertia running mode is extended and the fuel consumption is improved as compared to the engine brake running mode. As compared to the neutral inertia running mode, therefore, the engine brake force is large and the inertia running distance in the inertia running mode is relatively short; however, since the engine 12 is simply driven to rotate due to the fuel cut, the efficiency of the fuel consumption is at a comparable level with, or equal to or greater than, that of the neutral inertia running mode.

The free-run inertia running means 84 performs a free-run inertia running mode (hereinafter also referred as "free-run inertia running") in the inertia running performable running state. As described in the correspondence table of FIG. 2, the free-run inertia running mode is performed by releasing the clutch C1 to disconnect the power transmission path between the engine 12 and the wheels 20 while a fuel cut F/C is performed to stop the fuel supply to the engine 12 so that the rotation of the engine 12 is stopped. In this case, since the engine brake force becomes smaller than that of the engine brake running mode and specifically, the release of the clutch C1 results in the engine brake force of substantially zero, a reduction in running resistance extends the inertia running distance in the inertia running mode, and fuel consumption can be improved. Since the fuel supply to the engine 12 is stopped, the free-run inertia running mode is more excellent in fuel consumption performance as compared to the neutral inertia running mode in which the engine 12 is put in the idle operation.

When a command of switching from a normal running mode (hereinafter also referred as "normal running") to the inertia running mode is output, the running mode switching control means 86 switches to any one of the running modes, which are the engine brake running mode, the neutral inertia running mode, the cylinder resting inertia running mode, and the free-run inertia running mode, depending on a running state. The inertia running mode to be selected is determined based on an operation region map prescribing an operation region of the inertia running mode obtained and stored in advance by using the vehicle speed V, the brake operation force Brk, the engine oil temperature Toile, the battery remaining amount SOC, etc. as parameters.

Learning control is provided in the engine 12 as needed depending on various operation states. For example, during the idle operation of the engine 12, idle learning of a closing amount of a throttle valve is performed so that the idle operation is stabilized. Various types of the deceleration learning are also performed during deceleration running. Although the learning of the engine 12 is performed as needed even during the inertia running mode, the idle learning of the engine 12 cannot be performed in the engine brake running mode, the cylinder resting inertia running mode, or the free-run inertia running mode since the engine 12 is stopped. If the operation is continued while the idle learning of the engine 12 is incomplete, this may lead to deteriorations in fuel consumption and emission. Therefore, if the idle learning is incomplete, the running mode switching control means 86 increases an operation region of performing the neutral inertia running mode in the region of performing the inertia running mode as compared to after completion of the idle learning. Since the engine 12 is in the idle operation state in the neutral inertia running mode, an increase in the operation region of performing the neutral inertia running mode increases opportunities to perform the neutral inertia running mode. Therefore, the opportunity of the idle learning is ensured.

Figures 2, 3:
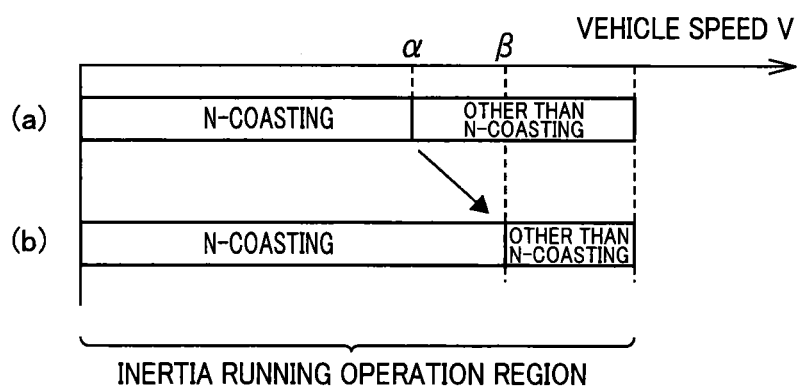
FIG. 2 is a table for explaining respective four running modes of inertia running performed by the vehicle drive device of FIG. 1.
FIG. 3 depicts a pattern of an operation region map further defining the running mode to be selected at the time of switchover to the inertia running mode.
Figure 4:
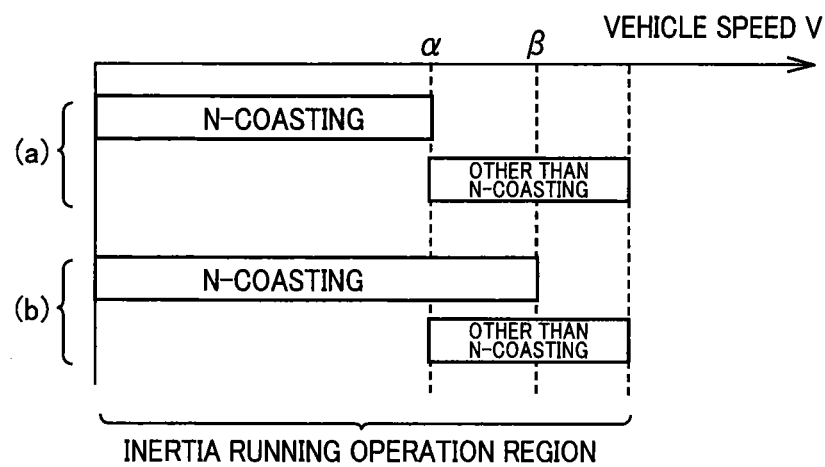
FIG. 4 depicts another pattern of the operation region map further defining the running mode to be selected at the time of switchover to the inertia running mode.
Figure 5:
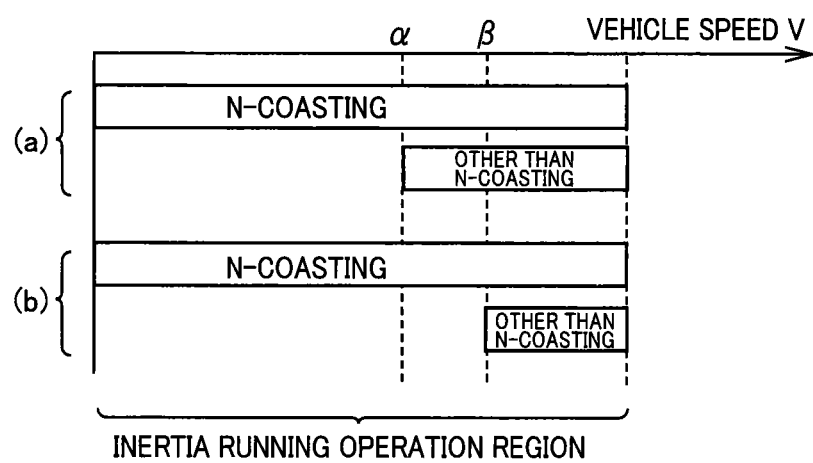
FIG. 5 depicts a further pattern of the operation region map further defining the running mode to be selected at the time of switchover to the inertia running mode.

FIGS. 3 to 5 depict three patterns of the operation region maps of the inertia running mode further defining the inertia running mode to be selected at the time of switchover to the inertia running mode by way of example. In FIGS. 3 to 5, "N-COASTING" corresponds to the neutral inertia running mode and "OTHER THAN N-COASTING" corresponds to the engine brake running mode, the cylinder resting inertia running mode, and the free-run inertia running mode. Although the vehicle speed V is applied as a parameter for further defining the inertia running mode in FIGS. 3 to 5, the brake operation force Brk (or a brake stroke amount), the engine oil temperature Toile, and the battery remaining amount SOC are also applied as needed. FIG. 3($a$) depicts the operation region during the inertia running mode and particularly depicts an operation region map after completion of the idle learning. Specifically, the neutral inertia running mode (N-coasting) is performed when the vehicle speed V is less than a threshold value $\alpha$, and the inertia running mode other than the neutral inertia running mode (the engine brake running mode, the cylinder resting inertia running mode, or the free-run inertia running mode) is performed when the vehicle speed V is equal to or greater than the threshold value $\alpha$. On the other hand, FIG. 3($b$) depicts an operation region map before completion of the idle learning. Specifically, the neutral inertia running mode is performed when the vehicle speed V is less than a threshold value $\beta$, and the inertia running mode other than the neutral inertia running mode is performed when the vehicle speed V is equal to or greater than the threshold value $\beta$. As depicted in FIG. 3, the threshold value of the vehicle speed V before completion of the idle learning is changed to a value larger than the threshold value $\alpha$ after completion of the idle learning. Therefore, when the idle learning is incomplete, the operation region of performing the neutral inertia running mode is increased in the operation region of performing the inertia running mode as compared to after completion of the idle learning. As a result, when the idle learning is incomplete, the execution condition of the neutral inertia running mode is more likely to be satisfied as compared to after completion of the idle learning. The threshold values $\alpha$ and $\beta$ are set to values obtained empirically or analytically in advance such that the opportunities of the learning can preferably be ensured and that the deteriorations in fuel consumption and emission can be suppressed.

FIG. 4(a) depicts the operation region during the inertia running mode and particularly depicts an operation region map after completion of the idle learning. Specifically, the neutral inertia running mode is performed when the vehicle speed V is less than the threshold value α, and the inertia running mode other than the neutral inertia running mode is performed when the vehicle speed V is equal to or greater than the threshold value α. On the other hand, FIG. 4(b) depicts an operation region map before completion of the idle learning. Specifically, the threshold value (an upper limit value) of the vehicle speed V for performing the neutral inertia running mode is changed to the threshold value β larger than the threshold value α to perform the neutral inertia running mode when the vehicle speed V is less than the threshold value α, to perform the neutral inertia running mode and the inertia running mode other than the neutral inertia running mode as needed when the vehicle speed V is equal to or greater than the threshold value α and less than the threshold value β, and to perform the inertia running mode other than the neutral inertia running mode when the vehicle speed V is equal to or greater than the threshold value β. Although FIG. 4(b) includes an operation region in which the operation region of the neutral inertia running mode and an operation region of other than the neutral inertia running mode coexist between the threshold value α and the threshold value β, the optimum running mode is selected based on another running condition, for example, the brake operation force Brk, the engine oil temperature Toile, and the battery remaining amount SOC and so on. For example, if the battery remaining amount SOC is equal to or less than a predetermined value, the neutral inertia running mode is selected for providing charge control.

As depicted in FIG. 4, when the idle learning is incomplete, the operation region of performing the neutral inertia running mode is increased in the operation region of performing the inertia running mode as compared to after completion of the idle learning. Therefore, when the idle learning is incomplete, the execution condition of the neutral inertia running mode is more likely to be satisfied as compared to after completion of the idle learning.

FIG. 5(a) depicts the operation region of the inertia running mode and particularly depicts an operation region map after completion of the idle learning. Specifically, the neutral inertia running mode is performed when the vehicle speed V is less than the threshold value α, and the neutral inertia running mode or the inertia running mode other than the neutral inertia running mode is selectively performed as needed when the vehicle speed V becomes equal to or greater than the threshold value α. On the other hand, FIG. 5(b) depicts an operation region map before completion of the idle learning. Specifically, the neutral inertia running mode is performed when the vehicle speed V is less than the threshold valuer β larger than the threshold value α, and the neutral inertia running mode or the inertia running mode other than the neutral inertia running mode is selectively performed as needed when the vehicle speed V becomes equal to or greater than the threshold value β. Although FIG. 5(a) and FIG. 5(b) include an operation region in which the neutral inertia running mode and the inertia running mode other than the neutral inertia running mode coexist, the optimum running mode is selected based on another running condition, for example, the brake operation force Brk, the engine oil temperature Toile, and the battery remaining amount SOC and so on. For example, if the battery remaining amount SOC is equal to or less than a predetermined value, the neutral inertia running mode is selected for providing charge control.

As depicted in FIG. 5, when the idle learning is incomplete, the execution condition of the inertia running mode other than the neutral inertia running mode is less likely to be satisfied as compared to after completion of the idle learning. In particular, when the idle learning is incomplete, the execution conditions of the cylinder resting inertia running mode, the engine brake running mode, and the free-run inertia running mode are less likely to be satisfied as compared to after completion of the idle learning. Although it appears that the operation region of the neutral inertia running mode is not increased before and after the idle learning in FIG. 5, since the operation region of the inertia running mode other than the neutral inertia running mode is narrowed before completion of the idle learning (FIG. 5(b)), the operation region of the neutral inertia running mode is substantially (relatively) increased. In FIG. 5(b), the operation region of the inertia running mode other than the neutral inertia running mode can be set to zero.

As described above, since the running mode switching control means 86 increases the operation region of performing the neutral inertia running mode in the operation region of performing the inertia running mode when the idle learning is incomplete as compared to after completion of the idle learning, the opportunities to perform the neutral inertia running mode are increased while the idle learning is incomplete, and the idle learning can promptly be completed.

During the inertia running mode, the deceleration learning of the engine 12 is also performed as needed. The deceleration learning of the engine 12 includes the learning requiring a flow of air, for example, learning of a rate of an air flow to a catalyst not depicted in an engine driven state, and the learning not necessarily requiring a flow of air. These types of the deceleration learning cannot be performed during the neutral inertia running mode and the free-run inertia running mode while the engine 12 is operated in a self-sustaining manner. Therefore, the deceleration learning is preferably performed during the cylinder resting inertia running mode and the engine brake running mode. This is because the engine 12 is passively rotated by the wheels 20 even when the fuel injection is stopped in these types of the inertia running mode. Deceleration learning which does not require a flow of air and can be performed when the crankshaft of the engine is passively rotated can be performed in both the cylinder resting inertia running mode and the engine brake running mode. On the other hand, the learning requiring a flow of air can be performed only in the engine brake running mode in which all the valves normally operate. Therefore, although the deceleration learning can preferably be performed in the engine brake running mode, the engine brake running mode makes the engine brake force larger and therefore is not suitable for fuel consumption performance since the inertia running distance becomes short. In contrast, the cylinder resting inertia running mode makes the inertia running distance longer as compared to the engine brake running mode and is preferable in terms of fuel consumption performance.

Therefore, if the deceleration learning is incomplete, the running mode switching control means 86 increases an operation region of performing the cylinder resting inertia running mode and the engine brake running mode in the operation region of performing the inertia running mode as compared to after completion of the deceleration learning and, particularly when the deceleration learning requires only the rotation of the crankshaft, the running mode switching control means 86 increases the operation region of the cylinder resting inertia running mode. When the deceleration learning is the learning requiring a flow of air, the running mode switching control means 86 increases the operation region of the engine brake running mode. On the other hand, if the deceleration learning is completed, the running mode switching control means 86 increases an operation region of performing the free-run inertia running mode in the operation region of performing the inertia running mode as compared to before completion of the deceleration learning. Although the deceleration learning cannot be performed since the engine 12 is stopped, the free-run inertia running mode is suitable for fuel consumption performance since the inertia running distance is long and the fuel supply to the engine 12 is stopped. Therefore, when the deceleration learning is completed, since the operation region of the free-run inertia running mode is increased in the operation region of performing the inertia running mode, the free-run inertia running mode is more likely to be established and the fuel consumption can be improved.

For the operation region of the deceleration learning, as is the case with the idle learning described above, the operation region of performing the inertia running mode is set based on the vehicle speed V, the brake operation force Brk, etc., as depicted in FIGS. 3 to 5. For example, if the deceleration learning is incomplete and the deceleration learning is the learning requiring only the rotation of the crankshaft, the running mode switching control means 86 increases the operation region of the cylinder resting inertia running mode in the operation region of the inertia running mode as compared to after completion of the deceleration learning. As a result, the cylinder resting inertia running mode is more likely to be established, and an opportunity of the deceleration learning requiring the rotation of the crankshaft is ensured to promptly complete the deceleration learning. Although the deceleration learning requiring the rotation of the crankshaft can be performed in the engine brake running mode, the fuel consumption is improved by performing the learning in the cylinder resting inertia running mode. This is because the cylinder resting inertia running mode makes the inertia running distance longer and reduces engine start requests due to reacceleration as compared to the engine brake running mode.

If the deceleration learning is incomplete and the deceleration learning is the learning requiring a flow of air, the running mode switching control means 86 increases the operation region of the engine brake running mode in the operation region of the inertia running mode as compared to after completion of the deceleration learning. Therefore, an opportunity of the deceleration learning requiring a flow of air is ensured to promptly complete the deceleration learning.

If the deceleration learning is completed, the running mode switching control means 86 increases the operation region of performing the free-run inertia running mode in the operation region of the inertia running mode as compared to before completion of the deceleration learning. Therefore, when the deceleration learning is completed, since the free-run inertia running mode is more likely to be established and the opportunities to perform the free-run inertia running mode are increased, the fuel consumption is further improved.

If the deceleration learning is incomplete and both the learning requiring a flow of air and the learning requiring the rotation of the crankshaft are incomplete, the running mode switching control means 86 increases the operation region of the engine brake running mode in the operation region of the inertia running mode. Since the engine brake running mode is associated with both the flow of air and the rotation of the crankshaft, these types of the deceleration learning are enabled by performing the engine brake running mode. Since the operation region of the engine brake running mode is increased, the opportunities to perform these types of the deceleration learning are ensured by the engine brake running mode and these types of the deceleration learning are promptly performed.

Figure 6:
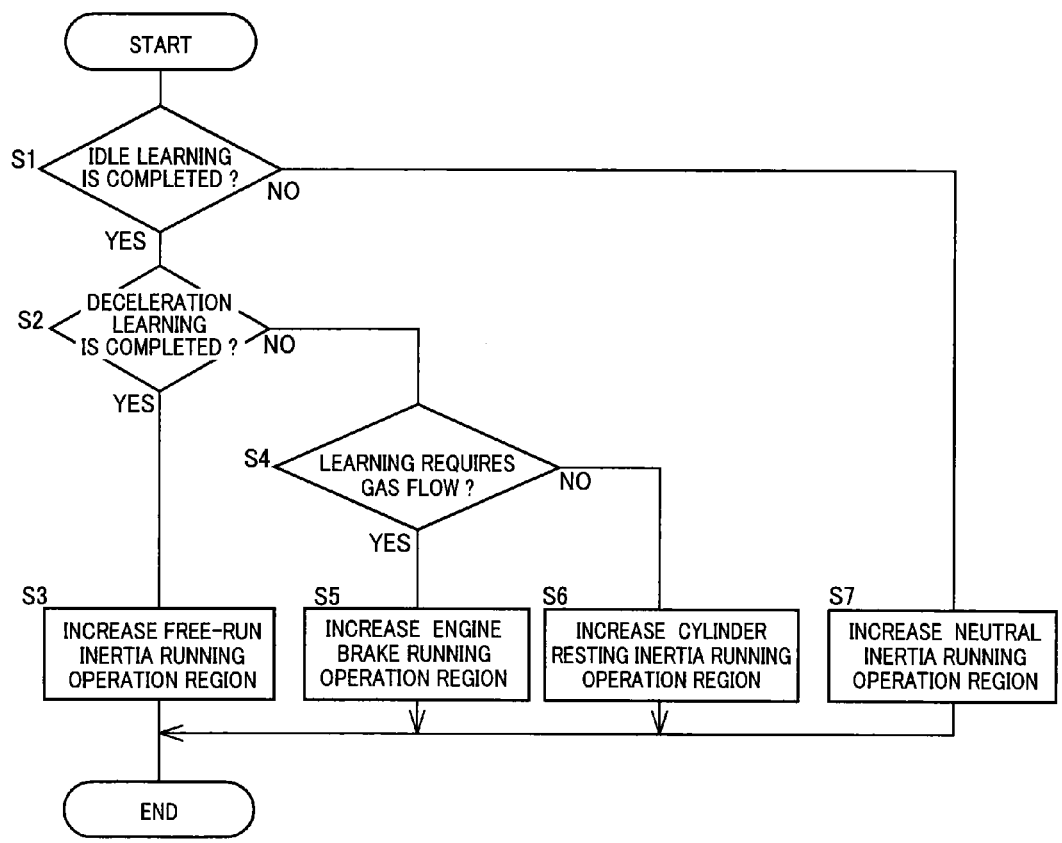
FIG. 6 is a flowchart for explaining a main portion of the control operation of an electronic control device of FIG. 1, i.e., the control operation capable of improving fuel consumption while ensuring the learning opportunities by selectively using the inertia running mode depending on a learning completion status in a vehicle capable of performing the neutral inertia running mode and the cylinder resting inertia running mode.

FIG. 6 is a flowchart for explaining a main portion of the control operation of the electronic control device 50, i.e., the control operation capable of improving the fuel consumption while ensuring the learning opportunities by selectively using the inertia running mode depending on a learning completion status in a vehicle capable of performing the neutral inertia running mode and the cylinder resting inertia running mode, and is repeatedly executed with an extremely short cycle time, for example, on the order of a few msec to a few tens of msec. The flowchart of FIG. 6 is executed when the command of switching to the inertia running mode is output. Steps S1 to S7 of FIG. 6 correspond to the running mode switching control means 86.

At step S1 (hereinafter, step will be omitted), it is determined whether the idle learning of the engine 12 is completed at the time of switching to the inertia running mode. If S1 is negative, it is determined that the idle learning is incomplete, and the operation region of performing the neutral inertia running mode is increased in the operation region of performing the inertia running mode at S7. Therefore, since the neutral inertia running mode is more likely to be established and the opportunity to perform the idle learning is ensured during the neutral inertia running mode, the idle learning can promptly be completed.

On the other hand, if S1 is affirmative, it is determined at S2 whether the deceleration learning of the engine 12 is completed. If S2 is negative, it is determined that the deceleration learning of the engine 12 is incomplete, and it is determined at S4 whether the deceleration learning is the deceleration learning requiring a flow of air. If S4 is negative, it is determined that the deceleration learning requiring a flow of air is completed, and the operation region of performing the cylinder resting inertia running mode is increased in the operation region of performing the inertia running mode at S6. Therefore, the cylinder resting inertia running mode is more likely to be established and the opportunity of the deceleration learning performed in the cylinder resting inertia running mode is ensured. Although even the deceleration learning can be performed in the engine brake running mode, the engine brake running mode makes the inertia running distance short and easily leads to a reduction in fuel consumption. In contrast, the fuel consumption is improved by performing the cylinder resting inertia running mode.

If S4 is affirmative, it is determined that the learning requiring a flow of air is incomplete, and the operation region of the engine brake running mode is increased at S5. Therefore, since the engine brake running mode is more likely to be established and the opportunity to perform the deceleration learning executed during the engine brake running mode is ensured, the deceleration learning can promptly be completed.

Returning to S2, if S2 is affirmative, i.e., if it is determined that the deceleration learning is completed, the operation region of performing the free-run inertia running mode is increased in the operation region of performing the inertia running mode at step S3. Therefore, since the free-run inertia running mode is more likely to be established and the opportunities of the free-run inertia running mode are increased, the fuel consumption is improved.

In the flowchart of FIG. 6, the learning of the engine is set such that the idle learning is most preferentially performed and that the deceleration learning is subsequently preferentially performed. In particular, the learning is set such that, if neither the idle learning nor the deceleration learning is completed, the idle learning is first completed. Although the order of priority is not particularly set for specific learning contents of the deceleration learning, setting is made such that the inertia running mode with a larger fuel consumption effect from the inertia running mode is preferentially performed. For example, if the learning can be performed in both the cylinder resting inertia running mode and the engine brake running mode, the learning performable in the cylinder resting inertia running mode excellent in fuel consumption performance is preferentially performed.

Figure 7:
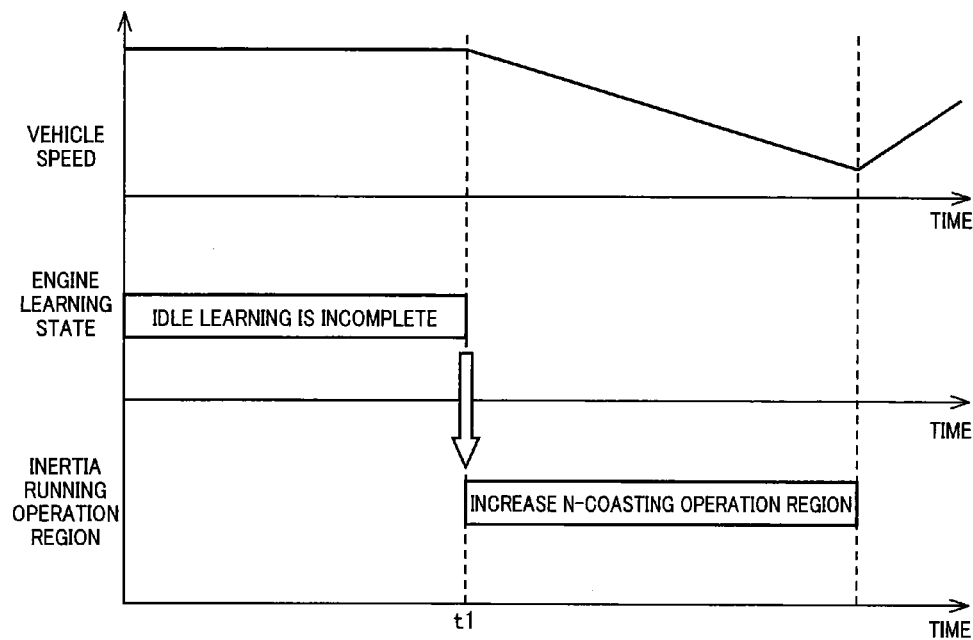
FIG. 7 is a time chart of results of the control provided based on the flowchart of FIG. 6.
Figure 8:
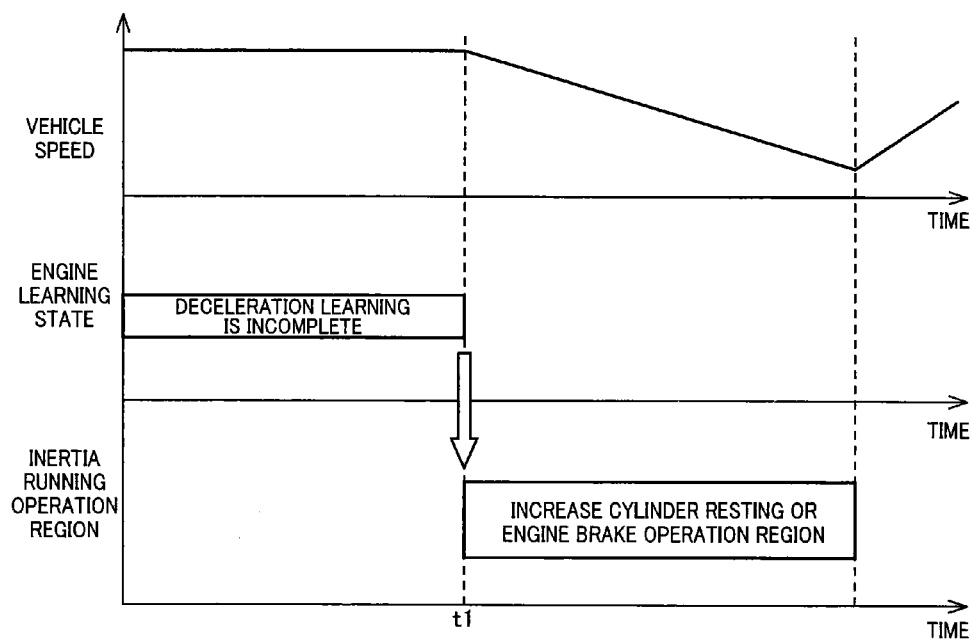
FIG. 8 is another time chart of results of the control provided based on the flowchart of FIG. 6.

FIGS. 7 and 8 are time charts of results of the control provided based on the flowchart of FIG. 6. FIG. 7 corresponds to the case when the idle learning is incomplete and FIG. 8 corresponds to when the deceleration learning is incomplete. Describing FIG. 7, a normal running mode is performed before time t1 and the idle learning of the engine 12 is in an incomplete state at this time point. At time t1, when a switchover to the inertia running mode is determined based on, for example, an operation of turning off an accelerator pedal, the operation region of the neutral inertia running mode is increased in the operation region of the inertia running mode also based on the fact that the idle learning is incomplete. Therefore, the neutral inertia running mode is more likely to be established and the opportunity to perform the idle learning is ensured during the neutral inertia running mode.

Describing FIG. 8, a normal running mode is performed before time t1 and the deceleration learning is in an incomplete state at this time point. At time t1, when a switchover to the inertia running mode is determined based on, for example, an operation of turning off an accelerator pedal, the operation region of the cylinder resting inertia running mode or the engine brake running mode is increased in the operation region of the inertia running mode also based on that fact that the deceleration learning is incomplete. Therefore, the opportunity to perform the deceleration learning is ensured.

As described above, according to this example, when the idle learning is incomplete, the operation region of performing the neutral inertia running mode increases in the operation region of performing the inertia running mode as compared to after completion of the idle learning. Therefore, the engine 12 is put into the idle operation state during the inertia running mode in an expanded region and the opportunity to perform the idle learning can be ensured. Thus, the idle learning can be completed early to prevent the deteriorations in fuel consumption and emission due to the incomplete idle learning. After completion of the idle learning, since the operation region of performing the neutral inertia running mode is not increased, the operation region of performing another type of inertia running mode without fuel injection such as the cylinder resting inertia running mode becomes larger, and the fuel consumption can be improved. After completion of the idle learning, since the operation region of performing the neutral inertia running mode is not increased, the operation region of performing the cylinder resting inertia running mode becomes larger, and the opportunity to perform the deceleration learning can be ensured.

According to this example, when the idle learning is incomplete, the execution condition of the neutral inertia running mode is made easy to be satisfied as compared to after completion of the idle learning and, therefore, when the idle learning is incomplete, the execution condition of the neutral inertia running mode is more likely to be satisfied and the opportunity to perform the idle learning can be ensured.

According to this example, when the idle learning is incomplete, the execution condition of the cylinder resting inertia running mode is made hard to be satisfied as compared to after completion of the idle learning and, therefore, when the idle learning is incomplete, since the execution condition of the cylinder resting inertia running mode is less likely to be satisfied, the neutral inertia running mode is more likely to be established instead. Thus, when the idle learning is incomplete, the neutral inertia running mode is more likely to be established and the opportunity to perform the idle learning can be ensured.

According to this example, if the deceleration learning is incomplete that is performed when the fuel injection to the engine 12 is stopped and the engine 12 is passively rotated by the wheels 20, the operation region of performing the cylinder resting inertia running mode is increased in the operation region of performing the inertia running mode as compared to after completion of the deceleration learning. As a result, when the deceleration learning is incomplete, the operation region of performing the cylinder resting inertia running mode increases in the operation region of performing the inertia running mode as compared to after completion of the deceleration learning, and the opportunity can be ensured for performing the deceleration learning performable during the cylinder resting inertia running mode. Therefore, the deceleration learning can be completed early to prevent the deteriorations in fuel consumption and emission due to the incomplete deceleration learning.

Another example of the present invention will be described. In the following description, the portions common to the examples are denoted by the same reference numerals and will not be described.

SECOND EXAMPLE

In this example, a driver's seat is provided with an inertia running mode selecting switch capable of selectively switching the inertia running mode and a driver can selectively switch the inertia running mode during the inertia running mode. For example, the driver's seat is provided with a cylinder resting inertia running switch, a neutral inertia running switch, and a free-run inertia running switch, and the driver can push these switches to switch to an arbitrary type of inertia running mode. If none of the switches is selected, the engine brake running mode is selected.

If the driver can selectively switch the inertia running mode in this way, the running mode switching control means 86 switches to the neutral inertia running mode when the idle learning is incomplete even if the driver selects, for example, the cylinder resting inertia running mode, which is the inertia running mode other than the neutral inertia running mode. Because of this setting, if the idle learning is incomplete, the opportunity of the idle learning is preferentially ensured and the idle learning can promptly be completed to prevent the deteriorations in fuel consumption and emission. The form as described above substantially includes increasing the operation region of performing the neutral inertia running mode in the operation region of performing the inertia running mode when the idle learning is incomplete as compared to after completion of the idle learning.

Figure 9:
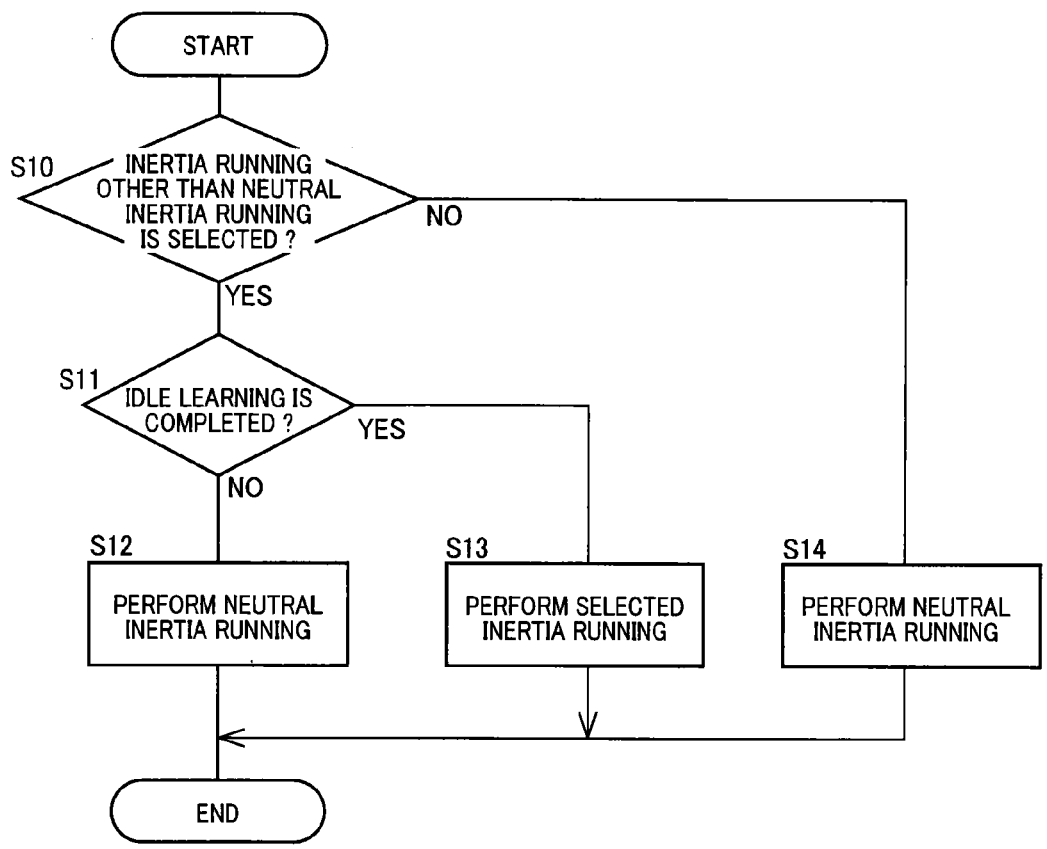
FIG. 9 is a flowchart for explaining a main portion of the control operation of the electronic control device of another example of the present invention, i.e., the control operation capable of ensuring the opportunity of the idle learning to promptly complete the idle learning when the idle learning is incomplete.

FIG. 9 is a flowchart for explaining a main portion of the control operation of the electronic control device (running control device) of this example, i.e., the control operation capable of ensuring the opportunity of the idle learning to promptly complete the idle learning when the idle learning is incomplete. The flowchart of FIG. 9 is executed when the operation state of performing the inertia running mode is achieved.

First, at S10 corresponding to the running mode switching control means 86, it is determined whether the inertia running mode other than the neutral inertia running mode is selected during the inertia running mode. If S10 is negative, the neutral inertia running mode is selected and, therefore, the neutral inertia running mode is performed at S14 corresponding to the neutral inertia running means 80. If S10 is affirmative, at S11 corresponding to the running mode switching control means 86, it is determined whether the idle learning of the engine 12 is completed. If S11 is affirmative, it is determined that the idle learning is completed and the selected inertia running mode is performed at S13. If S11 is negative, it is determined that the idle learning is incomplete and the neutral inertia running mode is performed at S12 corresponding to the neutral inertia running means 80.

As described above, according to, this example, if the idle learning is incomplete, the neutral inertia running mode is preferentially performed to ensure the opportunity of the idle learning and the idle learning can promptly be completed. This enables the prevention of the deteriorations in fuel consumption and emission due to the incomplete idle learning.

THIRD EXAMPLE

In this example, same as described in the second example, a driver's seat is provided with an inertia running mode selecting switch capable of selectively switching the inertia running mode and a driver can selectively switch the inertia running mode during the inertia running mode. For example, the driver's seat is provided with a cylinder resting inertia running switch, a neutral inertia running switch, and a free-run inertia running switch, and the driver can push these switches to switch to an arbitrary type of inertia running mode. If none of the switches is selected, the engine brake running mode is selected.

If the driver can selectively switch the inertia running mode in this way, the running mode switching control means 86 switches to the cylinder resting inertia running mode or the engine brake running mode when the deceleration learning is incomplete even if the driver selects the inertia running mode (the neutral inertia running mode or the free-run inertia running mode) other than the cylinder resting inertia running mode. Because of this setting, if the deceleration learning is incomplete, the opportunity of the deceleration learning is preferentially ensured and the deceleration learning can promptly be completed to prevent the deteriorations in fuel consumption and emission. The form as described above substantially includes increasing the operation region of performing the cylinder resting inertia running mode in the operation region of performing the inertia running mode when the deceleration learning is incomplete as compared to after completion of the deceleration learning.

Figure 10:
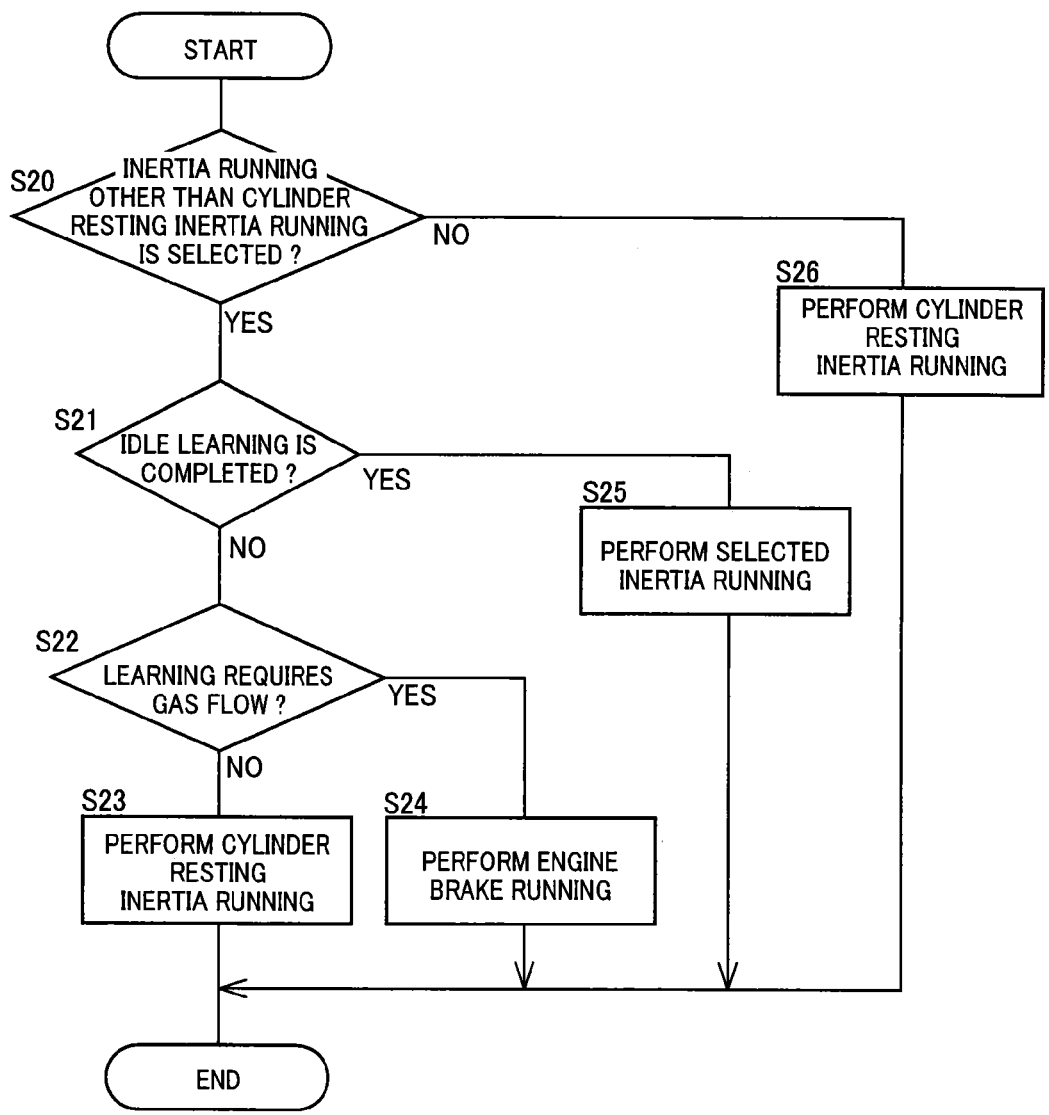
FIG. 10 is a flowchart for explaining a main portion of the control operation of the electronic control device of a further example of the present invention, i.e., the control operation capable of ensuring the opportunity of the deceleration learning to promptly complete the deceleration learning when the deceleration learning is incomplete.

FIG. 10 is a flowchart for explaining a main portion of the control operation of the electronic control device (running control device) of this example, i.e., the control operation capable of ensuring the opportunity of the deceleration learning to promptly complete the deceleration learning when the deceleration learning is incomplete. The flowchart of FIG. 10 is executed when the operation state of performing the inertia running mode is achieved.

First, at S20 corresponding to the running mode switching control means 86, it is determined whether the inertia running mode other than the cylinder resting inertia running mode is selected. If S20 is negative, it is determined that the cylinder resting inertia running mode is selected, and the cylinder resting inertia running mode is performed at S26 corresponding to the cylinder resting inertia running means 82. If S20 is affirmative, at S21 corresponding to the running mode switching control means 86, it is determined whether the deceleration learning is completed. If S21 is affirmative, it is determined that the deceleration learning is completed and the selected inertia running mode is performed at S25. If S21 is negative, it is determined that the deceleration learning is incomplete and it is determined at S22 corresponding to the running mode switching control means 86 whether the incomplete deceleration learning is the learning requiring a flow of air. If S22 is affirmative, it is determined that the learning requires a flow of air, and the engine brake running mode generating a flow of air is performed at S24 corresponding to the engine brake running means 78. If S22 is negative, it is determined that a flow of air is not required, and the cylinder resting inertia running mode is performed at S23 corresponding to the cylinder resting inertia running means 82.

As described above, according to this example, if the deceleration learning is incomplete, the cylinder resting inertia running mode or the engine brake running mode is preferentially performed to ensure the opportunity of the deceleration learning and the deceleration learning can promptly be completed. This enables the prevention of the deteriorations in fuel consumption and emission due to the incomplete deceleration learning. If the incomplete deceleration learning is the learning not requiring a flow of air, the inertia running distance is made longer by performing the cylinder resting inertia running mode as compared to when the engine brake running mode is selected, and the fuel consumption can be improved.

Although the examples of the present invention have been described in detail with reference to the drawings, the present invention is also applied in other forms.

For example, the examples may not necessarily independently be implemented and the examples may be implemented in a combined manner as needed without contradiction.

Although the idle learning is performed in preference to the deceleration learning in the examples, the deceleration learning may preferentially be performed. Specifically, in the flowchart of FIGS. 6, S1 and S2 may be executed in the reverse order.

Although the clutch C1 connecting/disconnecting the power transmission path between the engine 12 and the wheels 20 is the clutch C1 included in the automatic transmission 16 including pluralities of clutches and brakes and switchable to neutral in the examples, the clutch C1 is not limited to the clutch included in the automatic transmission 16 and is not particularly limited as long as the clutch connects and disconnects the power transmission path between the engine 12 and the wheels 20. The clutch is not limited to a hydraulic friction engagement device and can be implemented by using various connecting/disconnecting devices such as an electromagnetic clutch, for example.

Although the stepped automatic transmission 16 is applied that is of a planetary gear type etc., having a plurality of gear stages with different gear ratios γ established depending on engaged/released states of a plurality of hydraulic friction engagement devices (clutches and brakes) in the examples, a specific structure of the transmission is not particularly limited to that of the examples. The present invention is applicable to a transmission of a different type including a belt type continuously variable transmission, for example.

Although both the intake and exhaust valves are stopped in the closed valve state during the cylinder resting inertia running mode in the examples, this is not necessarily a limitation and the present invention may be implemented in the form of opening both the intake and exhaust valves, for example, and is not limited to the form of closing the intake and exhaust valves.

The flowcharts (FIGS. 6, 9, and 10) described in the examples are merely examples and may be executed with the order changed as needed without contradiction.

The above description is merely an embodiment and the present invention can be implemented in variously modified and improved forms based on the knowledge of those skilled in the art.

NOMENCLATURE OF ELEMENTS

11: cylinders
12: engine
20: wheels
50: electronic control device (running control device)
C1: clutch

The invention claimed is:

1. A running control device of a vehicle including an engine with a plurality of cylinders, and a clutch connecting/disconnecting a power transmission path between the engine and wheels, the running control device of a vehicle performing during an inertia running mode
   a neutral inertia running mode performed with the power transmission path between the engine and the wheels disconnected while the engine is kept operated, and
   a cylinder resting inertia running mode performed by resting at least a part of the cylinders of the engine while the power transmission path between the engine and the wheels is connected,
   the running control device of a vehicle increasing an operation region of performing the neutral inertia running mode in an operation region of performing the inertia running mode when idle learning performed in an idle operation state of the engine is incomplete, as compared to after completion of the idle learning.

2. The running control device of a vehicle of claim 1, wherein when the idle learning is incomplete, an execution condition of the neutral inertia running mode is made easy to be satisfied as compared to after completion of the idle learning.

3. The running control device of a vehicle of claim 1, wherein when the idle learning is incomplete, an execution condition of the cylinder resting inertia running mode is made hard to be satisfied as compared to after completion of the idle learning.

4. The running control device of a vehicle of claim 1, wherein when deceleration learning is incomplete that is performed during fuel injection to the engine stopped and the engine passively rotated by the wheels, an operation region of performing the cylinder resting inertia running mode is increased in the operation region of performing the inertia running mode as compared to after completion of the deceleration learning.

* * * * *